(12) United States Patent
Shen et al.

(10) Patent No.: US 11,741,307 B2
(45) Date of Patent: Aug. 29, 2023

(54) SYSTEM AND METHOD FOR LEARNING NEW CONCEPTS FROM INPUT UTTERANCES

(71) Applicant: Samsung Electronics Co., Ltd., Suwon-si (KR)

(72) Inventors: Yilin Shen, Santa Clara, CA (US); Hongxia Jin, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 146 days.

(21) Appl. No.: 17/075,353

(22) Filed: Oct. 20, 2020

(65) Prior Publication Data

US 2022/0005464 A1 Jan. 6, 2022

Related U.S. Application Data

(60) Provisional application No. 63/048,532, filed on Jul. 6, 2020.

(51) Int. Cl.
*G06F 40/30* (2020.01)
*G10L 15/14* (2006.01)
(Continued)

(52) U.S. Cl.
CPC ............ *G06F 40/30* (2020.01); *G06F 18/214* (2023.01); *G06N 7/01* (2023.01); *G10L 15/14* (2013.01);
(Continued)

(58) Field of Classification Search
None
See application file for complete search history.

(56) References Cited

U.S. PATENT DOCUMENTS 9,159,318 B2 * 10/2015 Hakkani-Tur .......... G10L 15/07
9,489,942 B2 * 11/2016 Lee .......................... G10L 15/14
(Continued)

FOREIGN PATENT DOCUMENTS

WO   WO-2014087506 A1 *   6/2014   ............. G06F 17/27

OTHER PUBLICATIONS

Elbayad et al., "Token-level and sequence-level loss smoothing for RNN language models" arXiv preprint arXiv:1805.05062 May 14, 2018 (Year: 2018).*

(Continued)

*Primary Examiner* — Richard Z Zhu

(57) ABSTRACT

A method includes applying, by at least one processor, a natural language understanding (NLU) model to an input utterance in order to obtain initial slot probability distributions. The method also includes performing, by the at least one processor, a confidence calibration by applying a calibration probability distribution to the initial slot probability distributions in order to generate calibrated slot probability distributions. The calibration probability distribution has a higher number of dimensions than the initial slot probability distributions. The method further includes identifying, by the at least one processor, uncertainties associated with words in the input utterance based on the calibrated slot probability distributions. In addition, the method includes identifying, by the at least one processor, a new concept contained in the input utterance that is not recognized by the NLU model based on the identified uncertainties.

20 Claims, 6 Drawing Sheets

(51) Int. Cl.
  *G10L 15/22* (2006.01)
  *G10L 15/18* (2013.01)
  *G06F 18/214* (2023.01)
  *G06N 7/01* (2023.01)
  *G06F 40/216* (2020.01)
  *G06F 40/295* (2020.01)
  *G10L 15/16* (2006.01)
  *G06F 40/279* (2020.01)
  *G10L 25/30* (2013.01)

(52) U.S. Cl.
  CPC .......... *G10L 15/1822* (2013.01); *G10L 15/22* (2013.01); *G06F 40/216* (2020.01); *G06F 40/279* (2020.01); *G06F 40/295* (2020.01); *G10L 15/16* (2013.01); *G10L 25/30* (2013.01)

(56) References Cited

U.S. PATENT DOCUMENTS

| | | | | |
|---|---|---|---|---|
| 9,811,519 | B2* | 11/2017 | Perez | G06F 40/35 |
| 9,830,315 | B1* | 11/2017 | Xiao | G06F 40/30 |
| 9,922,642 | B2* | 3/2018 | Pitschel | G10L 15/22 |
| 10,216,724 | B2* | 2/2019 | Sinha | G06N 7/005 |
| 10,943,583 | B1* | 3/2021 | Gandhe | G10L 15/183 |
| 10,956,683 | B2 | 3/2021 | Sapugay et al. | |
| 10,964,313 | B2 | 3/2021 | Morishita et al. | |
| 11,049,495 | B2 | 6/2021 | Tomar et al. | |
| 11,195,522 | B1* | 12/2021 | Makashir | G10L 15/1815 |
| 11,238,235 | B2 | 2/2022 | Rakshit et al. | |
| 2009/0157384 | A1 | 6/2009 | Toutanova et al. | |
| 2012/0053945 | A1 | 3/2012 | Gupta et al. | |
| 2015/0032443 | A1* | 1/2015 | Karov | G06F 16/36 704/9 |
| 2015/0073798 | A1* | 3/2015 | Karov | G06F 16/36 704/243 |
| 2015/0227845 | A1* | 8/2015 | Hakkani-Tur | G06F 40/35 706/52 |
| 2016/0027434 | A1* | 1/2016 | Hakkani-Tur | G10L 15/26 704/235 |
| 2018/0121415 | A1* | 5/2018 | Perez | G06F 16/367 |
| 2018/0144264 | A1 | 5/2018 | Ranzato et al. | |
| 2018/0293978 | A1* | 10/2018 | Sinha | G06F 40/232 |
| 2018/0329998 | A1* | 11/2018 | Thomson | H04N 21/41407 |
| 2019/0371307 | A1 | 12/2019 | Zhao et al. | |

OTHER PUBLICATIONS

IP.com English translation of WO2014/087506 A1. (Year: 2012).*
International Search Report and Written Opinion of the International Searching Authority dated Sep. 24, 2021 in connection with International Patent Application No. PCT/KR2021/007670, 9 pages.
Li et al., "Learning without Forgetting," IEEE Transactions on Pattern Analysis and Machine Intelligence, vol. 40, Issue 12, Feb. 2017, 13 pages.
Liu et al., "Attention-Based Recurrent Neural Network Models for Joint Intent Detection and Slot Filling," Interspeech 2016, Sep. 2016, 5 pages.
Jia et al., "Learning Concepts Through Conversations in Spoken Dialogue Systems," ICASSP 2017, IEEE, Mar. 2017, 5 pages.
U.S. Appl. No. 16/946,746 entitled "On-Device Lightweight Natural Language Understanding (NLU) Continual Learning" filed Jul. 2, 2020, 53 pages.

* cited by examiner

SYSTEM AND METHOD FOR LEARNING NEW CONCEPTS FROM INPUT UTTERANCES

CROSS-REFERENCE TO RELATED APPLICATION AND PRIORITY CLAIM

This application claims priority under 35 U.S.C. § 119(e) to U.S. Provisional Patent Application No. 63/048,532 filed on Jul. 6, 2020, which is hereby incorporated by reference in its entirety.

TECHNICAL FIELD

This disclosure relates generally to machine learning systems. More specifically, this disclosure relates to a system and method for learning new concepts from input utterances.

BACKGROUND

With the rise of modern artificially-intelligent voice-enabled personal assistants, natural language understanding (NLU) now plays an important role in understanding input utterances and in carrying out the intents of users. One common task in NLU is slot filling, which aims to extract semantic concepts from natural language input utterances. Existing slot filling approaches often rely on machine learning models that are trained using large amounts of pre-collected training data. However, it is infeasible for training data to cover all possible concepts that might be associated with input utterances, particularly considering the fast growth of new concepts. Because of this, it is common for trained machine learning models to incorrectly perform slot filling and intent detection for input utterances associated with new concepts. For instance, state-of-the-art NLU models are based on deep learning technologies and will often misinterpret a new concept as a random known concept.

SUMMARY

This disclosure relates to a system and method for learning new concepts from input utterances.

In a first embodiment, a method includes applying, by at least one processor, a natural language understanding (NLU) model to an input utterance in order to obtain initial slot probability distributions. The method also includes performing, by the at least one processor, a confidence calibration by applying a calibration probability distribution to the initial slot probability distributions in order to generate calibrated slot probability distributions. The calibration probability distribution has a higher number of dimensions than the initial slot probability distributions. The method further includes identifying, by the at least one processor, uncertainties associated with words in the input utterance based on the calibrated slot probability distributions. In addition, the method includes identifying, by the at least one processor, a new concept contained in the input utterance that is not recognized by the NLU model based on the identified uncertainties.

In a second embodiment, an apparatus includes at least one processor configured to apply an NLU model to an input utterance in order to obtain initial slot probability distributions. The at least one processor is also configured to perform a confidence calibration through application of a calibration probability distribution to the initial slot probability distributions in order to generate calibrated slot probability distributions. The calibration probability distribution has a higher number of dimensions than the initial slot probability distributions. The at least one processor is further configured to identify uncertainties associated with words in the input utterance based on the calibrated slot probability distributions. In addition, the at least one processor is configured to identify a new concept contained in the input utterance that is not recognized by the NLU model based on the identified uncertainties.

In a third embodiment, a non-transitory computer readable medium contains instructions that when executed cause at least one processor to apply an NLU model to an input utterance in order to obtain initial slot probability distributions. The medium also contains instructions that when executed cause the at least one processor to perform a confidence calibration through application of a calibration probability distribution to the initial slot probability distributions in order to generate calibrated slot probability distributions. The calibration probability distribution has a higher number of dimensions than the initial slot probability distributions. The medium further contains instructions that when executed cause the at least one processor to identify uncertainties associated with words in the input utterance based on the calibrated slot probability distributions. In addition, the medium contains instructions that when executed cause the at least one processor to identify a new concept contained in the input utterance that is not recognized by the NLU model based on the identified uncertainties.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
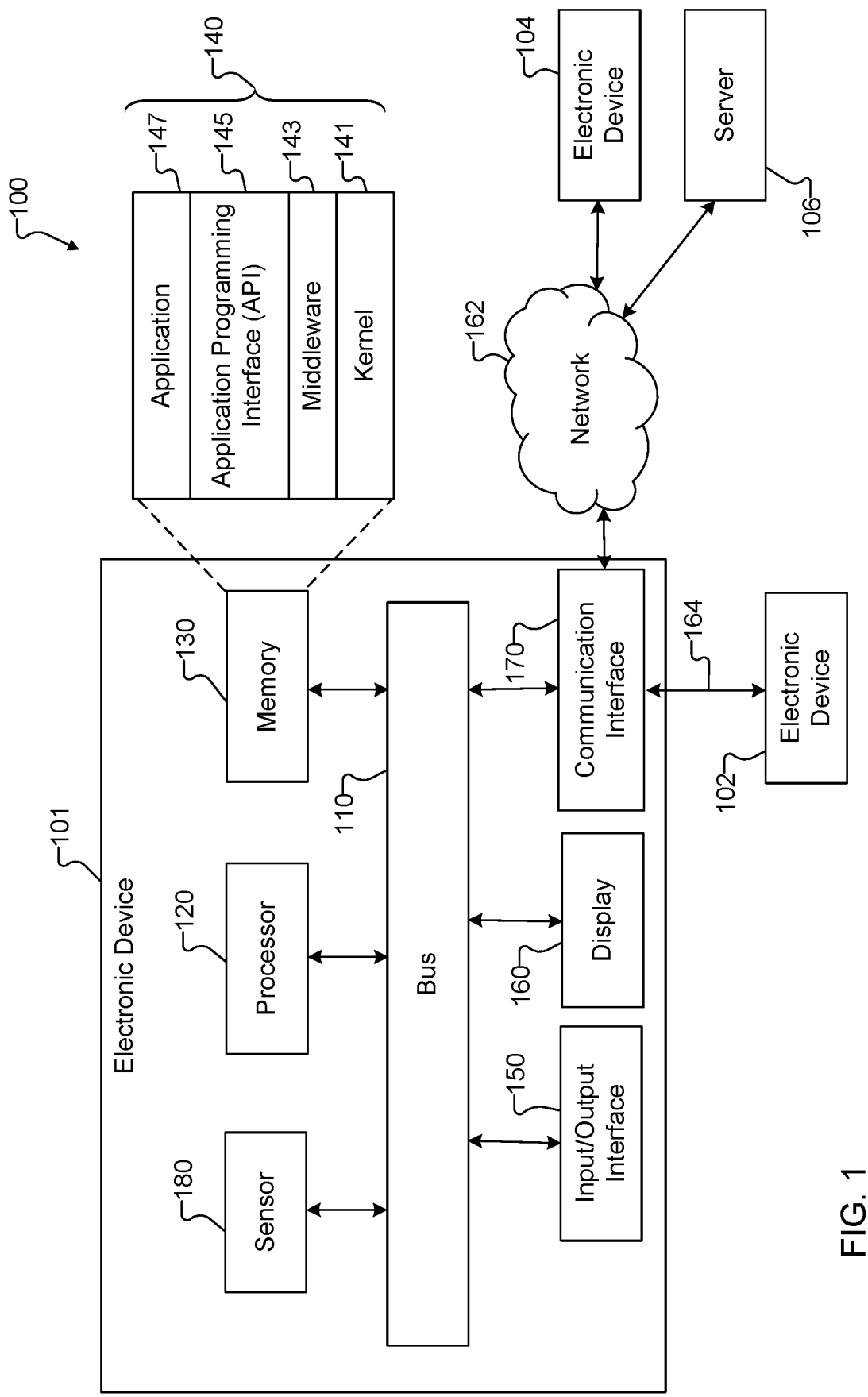
FIG. 1 illustrates an example network configuration including an electronic device in accordance with this disclosure.

FIGS. 1 through 7, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As noted above, with the rise of modern artificially-intelligent voice-enabled personal assistants, natural language understanding (NLU) now plays an important role in understanding input utterances and in carrying out the intents of users. One common task in NLU is slot filling, which aims to extract semantic concepts from natural language input utterances. Existing slot filling approaches often rely on machine learning models that are trained using large amounts of pre-collected training data. However, it is infeasible for training data to cover all possible concepts that might be associated with input utterances, particularly considering the fast growth of new concepts. Because of this, it is common for trained machine learning models to incorrectly perform slot filling and intent detection for input utterances associated with new concepts. For instance, state-of-the-art NLU models are based on deep learning technologies and will often misinterpret a new concept as a random known concept (which is often referred to as "over-confidence" of the model).

As examples of this, it is common for unknown words or phrases to be used in input utterances, such as when untrained words or phrases are used or when new words or phrases appear over time. It is also common for unknown personalized expressions to be used in input utterances, such as when idiosyncratic or personalized words or phrases are used by a specific user or a specific subset of users. In this document, the phrases "new concept" and "new concepts" are generally used to refer to one or more concepts that have not been learned by an NLU model, such as when the concepts were not included or could not have been included in training data for the NLU model. This may be the result of the concepts not being included in the training data because of limitations on the training data, such as due to the limited size or nature of the training data. This may also be the result of the concepts not existing at the time of NLU model training, such as due to the creation of new concepts (like new restaurant names or new book names) over time. In order to provide improved user experiences, it may be highly desirable to detect and learn new concepts as they appear in input utterances. Each new concept can relate to any aspect of an input utterance for which a trained NLU model cannot derive a suitable slot label or otherwise understand.

Some approaches have used rule-based techniques to ask clarification questions when new concepts are detected in input utterances. However, these approaches are generally not applicable to modern deep learning NLU models. Other approaches are often designed based on the assumption that new concepts can be identified using labeled training data, but labeled training data may not exist in many cases. Still other approaches can operate to detect if an entire utterance is new to an NLU model, but these approaches cannot extract new concepts from the utterance. These issues can be particularly problematic when considering the fact that numerous new concepts can emerge quickly over time after an NLU model has been trained and deployed.

This disclosure provides techniques for learning new concepts from input utterances. As described in more detail below, a trained NLU base model can be applied to an input utterance in order to obtain initial slot probability distributions. The initial slot probability distributions may identify likelihoods of different words in the input utterance belonging to different slot types. A confidence calibration may be performed by applying a calibration probability distribution (such as a Dirichlet distribution) to the initial slot probability distributions in order to generate calibrated slot probability distributions. The calibration probability distribution has a higher number of dimensions than the initial slot probability distributions, which helps to overcome issues associated with over-confidence of the NLU base model. Uncertainties associated with words in the input utterance can be identified based on the calibrated slot probability distributions, such as by calculating entropies of the calibrated slot probability distributions. A new concept contained in the input utterance that is not recognized by the NLU model can be identified based on the identified uncertainties.

At that point, one or more actions may occur in order to process or otherwise use the input utterance. For example, a word or phrase from the input utterance associated with the new concept may be identified, such as by selecting a word or phrase having at least one uncertainty that is larger than a threshold value. The identified word or phrase can be labeled as having an unknown slot type. A prompt for clarification of the new concept may be made, such as when a user is asked for the intent or meaning of the new concept or when an online database or other data source is accessed for information related to the new concept. Based at least partially on the clarification, slot filling may be performed for the identified word or phrase, and/or an action associated with the input utterance may be identified and performed. The NLU base model and/or the confidence calibration may be retrained based at least partially on the clarification, thereby allowing future input utterances related to the same or similar concept to be understood more effectively.

In this way, new concepts (such as words or phrases) contained in input utterances can be detected, and meanings for the new concepts can be identified. Rather than relying on labeled training data, the new concepts can be detected in the input utterances being processed using a trained NLU base model, which allows learning to occur while the trained NLU base model is in use and input utterances are being received from one or more users. These techniques may also be seamlessly integrated with any deep learning-based NLU model. Using these techniques, artificially-intelligent voice-enabled personal assistants or other systems that utilize natural language understanding can achieve improved performance. These techniques may also allow artificially-intelligent voice-enabled personal assistants or other systems that utilize natural language understanding to learn new concepts continuously over time. Among other things, this may help to account for the creation of new concepts over time, changing interests by users over time, and other factors that alter the concepts contained in input utterances being processed.

Note that the phrase "input utterance" in this document refers to any suitable text-based, voice-based, or other natural language-based input. An input utterance may be provided by a user or other source in any suitable manner. For example, an input utterance may be provided by a user typing the input utterance into an electronic device or by a user speaking the input utterance to an electronic device (which can perform speech-to-text recognition). Also note that the functionality described below is often described as being used with an artificially-intelligent voice-enabled personal assistant, such as one supported by a user's mobile electronic device or other "smart" electronic device. However, the functionality described below may be used in any suitable NLU-based system with any suitable electronic device.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), a graphics processor unit (GPU), an application processor (AP), or a communication processor (CP). The processor 120 is able to perform control on at least one of the other components of the electronic device 101 and/or perform an operation or data processing relating to communication. In some embodiments of this disclosure, for example, the processor 120 may obtain and process input utterances, identify new concepts in the input utterances, and perform slot filling, retraining, or other functions as described in more detail below.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, obtain and process input utterances, identify new concepts in the input utterances, and perform slot filling, retraining, or other functions as described in more detail below. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 can include one or more cameras or other imaging sensors, which may be used to capture images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. In some embodiments of this disclosure, the server 106 may obtain and process input utterances, identify new concepts in the input utterances, and perform slot filling, retraining, or other functions as described in more detail below.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
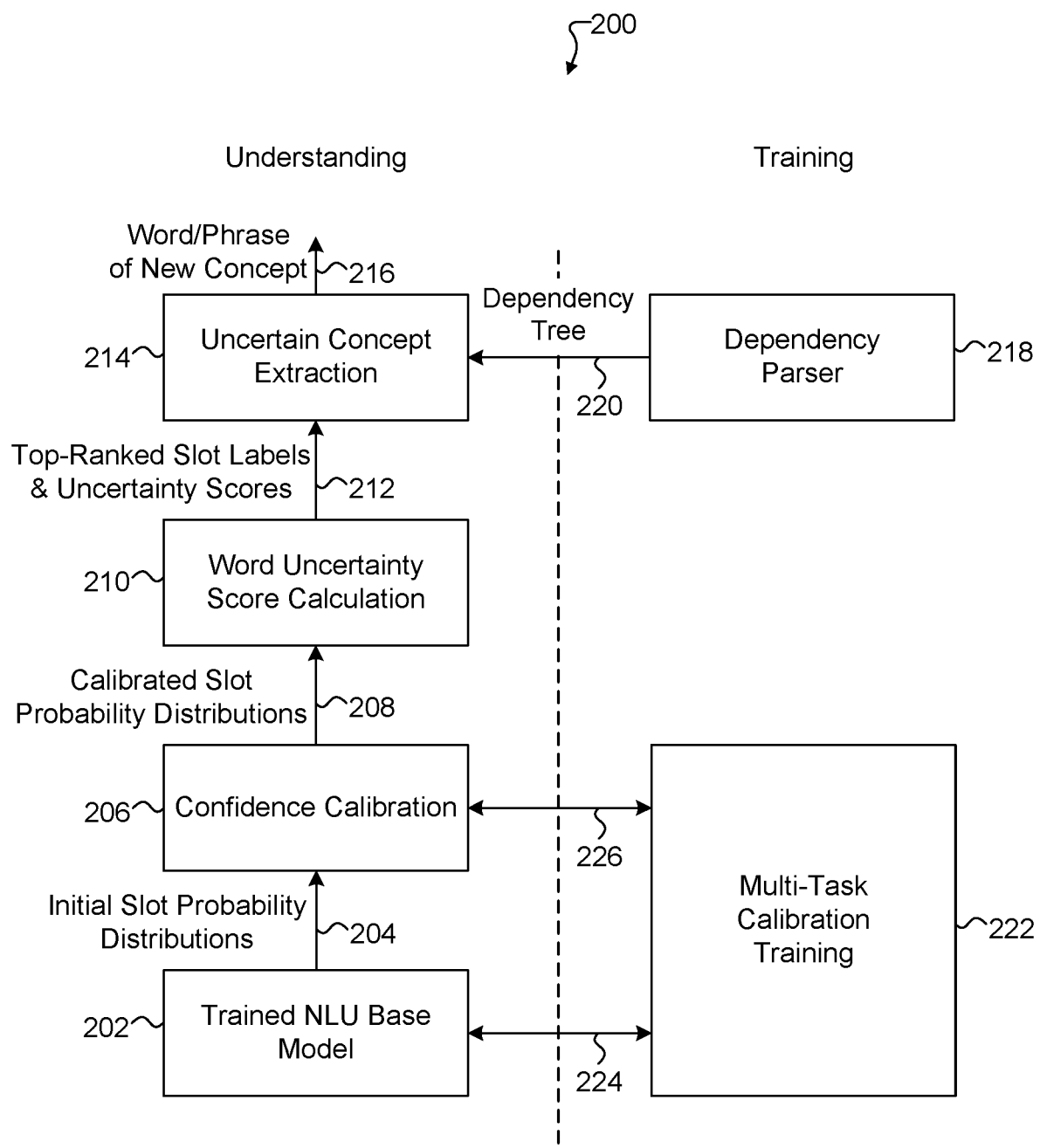
FIG. 2 illustrates an example technique for learning new concepts from input utterances in accordance with this disclosure.

FIG. 2 illustrates an example technique 200 for learning new concepts from input utterances in accordance with this disclosure. For ease of explanation, the technique 200 of FIG. 2 may be described as being used by the electronic device 101 of FIG. 1. However, the technique 200 may be used with any suitable device(s) and in any suitable system(s), such as when the technique 200 is used with the server 106 in FIG. 1 or in another system.

As shown in FIG. 2, the technique 200 involves the use of a trained NLU base model 202. The NLU base model 202 represents a machine learning model that has been trained to perform at least one NLU-related task. For example, the NLU base model 202 may be trained to perform slot filling and optionally intent detection operations. Slots refer to different parameters that may be included in input utterances being analyzed, and slot filling refers to identifying specific values for different slots based on the contents of the input utterances being analyzed. For instance, slots may refer to objects, locations, or times, and slot filling may be performed to identify the specific objects, locations, or times within the input utterances being analyzed. Intents refer to the overall meanings or purposes of the input utterances being analyzed. As a particular example of this, an input utterance of "reservation at Mario's Italiano for 1 pm" may be associated with a location slot (Mario's Italiano) and a time slot (1 pm), and the intent of this input utterance can be determined to be "reserve item."

The NLU base model 202 represents any suitable type of machine learning model that has been trained to perform at least one NLU-related task. Example types of NLU base models 202 that could be used here can include recurrent neural network (RNN)-based models and bidirectional encoder representations from transformers (BERT)-based models. Note, however, that this disclosure is not limited to any particular type of machine learning model. Also note that the technique 200 shown here may involve the use of multiple NLU base models 202 if needed or desired.

When the NLU base model 202 is applied to an input utterance, the NLU base model 202 is used to obtain initial slot probability distributions 204. Each initial slot probability distribution 204 represents a collection of probabilities that a specific word in the input utterance belongs to different slot types. For example, the NLU base model 202 might recognize nine different slot types, and each of the initial slot probability distributions 204 might represent nine probabilities for a specific word of the input utterance (where each probability is associated with a different one of the nine slot types). In typical NLU-based systems, a word would simply be assigned to a slot type based on the highest probability in its associated slot probability distribution 204, and the word would be labeled to identify its assigned slot type. In some cases, the "IOB" format is used to label words in input utterances, where "B" and "I" respectively indicate a beginning word and an intermediate word of a slot and "O" indicates that a word does not belong to any slot. In FIG. 2, however, the technique 200 processes the initial slot probability distributions 204 in order to identify any new concept in the input utterance that is not recognized by the NLU base model 202.

A confidence calibration operation 206 processes the initial slot probability distributions 204 in order to generate calibrated slot probability distributions 208. The confidence calibration operation 206 here can apply a calibration probability distribution to the initial slot probability distributions 204 in order to generate the calibrated slot probability distributions 208. The calibration probability distribution has a higher number of dimensions than the initial slot probability distributions 204. Because of this, possible slot labels for words of the input utterance are mapped from a lower-dimensional space associated with the initial slot probability distributions 204 to a higher-dimensional space associated with the calibration probability distribution. The use of the higher-dimensional space helps in learning the uncertainty of the slot probability distributions better so as to mitigate over-confidence of the NLU base model 202.

In some embodiments, the calibration probability distribution applied by the confidence calibration operation 206 represents a Dirichlet distribution, which is often denoted as $Dir(\alpha)$. A Dirichlet distribution is a continuous multivariate probability distribution that is parameterized by a vector $\alpha$ of positive real numbers. Also, in some embodiments, the confidence calibration operation 206 itself may be implemented as a machine learning model, such as a prior RNN (which may be degenerated as a softmax-based RNN in sequence labeling). The confidence calibration operation 206 in these embodiments may be used to degenerate the RNN-based slot filling model or other NLU base model 202 for sequence uncertainty estimation. In some cases, the confidence calibration operation 206 is used to degenerate and replace a softmax layer, which is routinely used in the NLU base model 202. Note that while the use of the Dirichlet distribution is often described in this patent document as being used to learn higher-dimensional distributions in order to replace a softmax function, any other suitable distribution may be used to learn higher-dimensional distributions, and the NLU base model 202 may or may not include a softmax function. For instance, histogram binning, Bayesian binning, or Gaussian generative model may be used by the confidence calibration operation 206. Once a particular higher-dimensional distribution is selected for use, the parameters of the lower-dimensional distribution can be tied to that particular higher-dimensional distribution.

A word uncertainty score calculation operation 210 processes the calibrated slot probability distributions 208 (and possibly the initial slot probability distributions 204) in order to identify top-ranked slot labels and uncertainty scores 212 for the associated words of the input utterance. The top-ranked slot labels represent slot labels having the highest probabilities (according to the calibrated slot probability distributions 208 and/or the initial slot probability distributions 204) for the associated words of the input utterance. The uncertainty score for each top-ranked slot label represents how certain the overall system is regarding the identified slot label for the associated word. In some cases, higher uncertainty scores may represent less certainty (more uncertainty), and lower uncertainty scores may represent less uncertainty (more certainty). However, any other suitable scoring system may be used here. In general, the word uncertainty score calculation operation 210 identifies little or no uncertainty when an input utterance does not involve any new concepts and more uncertainty when an input utterance involves at least one new concept.

In some cases, the top-ranked slot labels for words having low uncertainty (such as word having uncertainty scores below a threshold value) can be identified based on the initial slot probability distributions 204. For example, a softmax function or other function may be applied to the initial slot probability distribution 204 for any word of the input utterance that is determined to have a low uncertainty in order to identify that word's slot label. This allows slot labels to be obtained for any words of the input utterance that are likely to be interpreted correctly (since they have low uncertainty) using the initial slot probability distributions 204.

The top-ranked slot labels and uncertainty scores 212 are provided to an uncertain concept extraction operation 214, which uses the top-ranked slot labels and uncertainty scores 212 to identify a new concept (if any) in the input utterance being processed. For example, the uncertain concept extraction operation 214 may compare the uncertainty scores to a threshold value in order to determine whether any individual word in the input utterance has an excessive uncertainty. If an uncertainty score associated with a word exceeds the threshold value, the uncertain concept extraction operation 214 can determine that the input utterance contains a new concept, and the uncertain concept extraction operation 214 may identify that word and possibly a phrase containing that word as being related to the new concept. In this example, an output 216 of the uncertain concept extraction operation 214 represents the word or phrase associated with the new concept (if any).

The new concept or the identified word or phrase associated with the new concept may be used in any suitable manner. For example, the identified word or phrase may be labeled as having an unknown slot type (rather than incorrectly labeling the word or phrase with the wrong slot type due to over-confidence). The electronic device 101 may also prompt for clarification of the new concept. This may include the electronic device 101 asking a user to clarify the intent or meaning of the identified word or phrase or the input utterance, such as by asking the user one or more questions and receiving one or more answers from the user. This may also or alternatively include the electronic device 101 accessing an online database or other data source to identify a potential intent or meaning of the identified word or phrase or the input utterance. If information is obtained in response to the prompt, the electronic device 101 may perform slot filling for the identified word or phrase based on obtained information associated with the identified word or phrase.

In some embodiments, a dependency parser 218 may be used to generate a dependency tree 220, which can be used by the uncertain concept extraction operation 214. For example, the dependency parser 218 may analyze the grammatical structure of an input utterance in order to identify parts of speech and relationships between words in the input utterance. The dependency tree 220 breaks down an input utterance into different parts of speech and models the input utterance in a directed tree or directed graph format based on the relationships of the words. For instance, the dependency parser 218 may identify and the dependency tree 220 may represent any noun phrases (NPs), verb phrases (VPs), adjective phrases (ADJPs), adverb phrases (ADVPs), and/or prepositional phrases (PPs) in an input utterance. One or more words in each phrase can also be tagged with one or more labels, such as noun (NN), plural noun (NNS), verb (VB), coordinating conjunction (CD), or preposition or subordinating conjunction (IN). Any suitable dependency parser 218 may be used here to produce dependency trees 220.

The dependency tree 220 for an input utterance may be provided to the uncertain concept extraction operation 214 for use during the identification of a word or phrase in the output 216. For example, the uncertain concept extraction operation 214 may identify a word having an uncertainty above a threshold, and the uncertain concept extraction operation 214 can use the dependency tree 220 to determine whether that word is part of a larger phrase in the input utterance. If so, the uncertain concept extraction operation 214 may identify that entire phrase as being related to a new concept, rather than just the individual word.

In some embodiments, a multi-task calibration training operation 222 may be performed as part of the technique 200 in order to retrain the NLU base model 202 and/or to retrain the confidence calibration operation 206. For example, after the technique 200 has identified at least one word or phrase related to at least one new concept, slot filling may occur for the word(s) or phrase(s) (such as based on prompting or other information). Using the correct slot filling labels for the word(s) or phrase(s) (or using other information), the multi-task calibration training operation 222 can retrain the NLU base model 202 during retraining 224 and/or retrain the confidence calibration operation 206 during retraining 226 to recognize the new concept(s). This allows the NLU base model 202 and/or the confidence calibration operation 206 to learn the new concept(s) and thereby more effectively process subsequent input utterances that include the same or similar concept(s).

In particular embodiments, the retraining may include minimizing the sequence loss associated with the NLU base model 202 and maximizing the entropy loss associated with the confidence calibration operation 206. In some cases, the retraining of the confidence calibration operation 206 may enhance the robustness of uncertainty modeling by learning an adaptive calibration matrix that better separates existing (learned) and new (unlearned) concepts. Because of the retraining, subsequent input utterances related to the same or similar new concept may be processed more effectively, possibly without identifying any portion of the subsequent input utterances as being directed to any additional new concepts.

Again, note that the technique 200 shown in FIG. 2 may be performed using any suitable type(s) of NLU base model(s) 202. Given the number of possible NLU model types, the technique 200 can therefore be applied effectively across a number of applications. Also, the technique 200 shown in FIG. 2 can effectively identify new concepts and optionally words and phrases associated with those new concepts so that the intents or meanings of those new concepts can be identified, which supports effective learning by an overall system. In addition, the technique 200 shown in FIG. 2 may have negligible computational overhead (relative to the computational load already associated with use of an NLU model) and therefore can be easily implemented in any suitable device or system.

Additional details regarding various operations in the technique 200 are provided below. Note that the operations and functions described above with reference to FIG. 2 can be implemented in an electronic device 101, 102, 104, server 106, or other device in any suitable manner. For example, in some embodiments, the operations and functions described above can be implemented or supported using one or more software applications or other software instructions that are executed by at least one processor 120 of a device. In other embodiments, at least some of the operations and functions described above can be implemented or supported using dedicated hardware components. In general, the operations and functions described above can be performed using any suitable hardware or any suitable combination of hardware and software/firmware instructions.

Although FIG. 2 illustrates one example of a technique 200 for learning new concepts from input utterances, various changes may be made to FIG. 2. For example, each operation 206, 210, 214, 222 may occur any number of times as needed or desired in order to process input utterances and perform retraining. As a particular example, the operations 206, 210, 214 may occur repeatedly for each input utterance received and processed. If and when at least one new concept is identified a threshold number of times, the multi-task calibration training operation 222 may conduct the retraining 224 and/or the retraining 226 for the new concept(s). The threshold number can have any suitable value, including a value of one.

Figure 3:
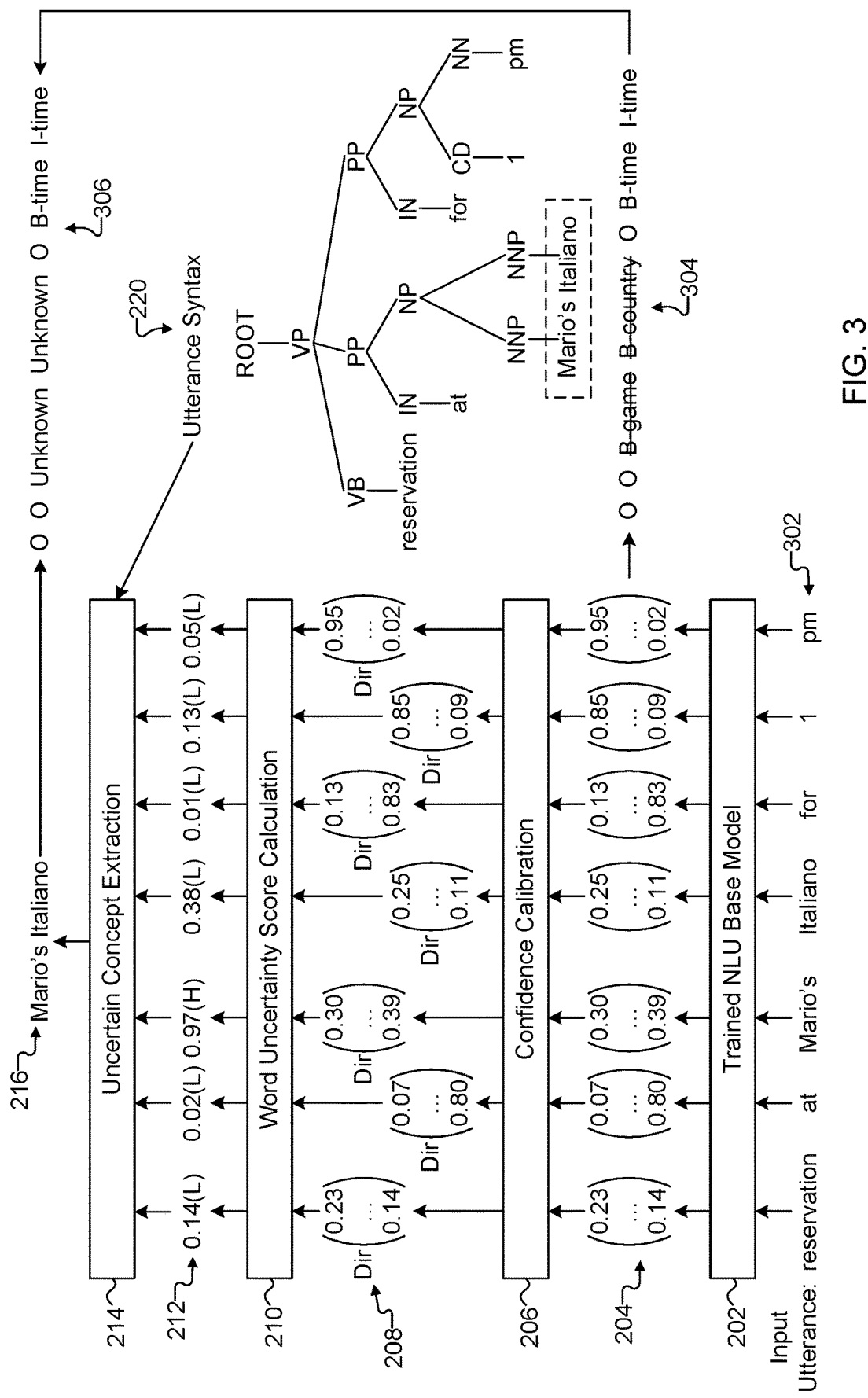
FIG. 3 illustrates an example application of the technique for learning new concepts from input utterances in accordance with this disclosure.

FIG. 3 illustrates an example application of the technique 200 for learning new concepts from input utterances in accordance with this disclosure. In particular, FIG. 3 illustrates how the technique 200 might operate in response to receiving a particular input utterance. Note, however, that this input utterance is for illustration only and does not limit this disclosure to any particular type of input utterance.

As shown in FIG. 3, the NLU base model 202 is applied to an input utterance 302 of "reservation at Mario's Italiano for 1 pm." The NLU base model 202 processes the input utterance 302 and generates the initial slot probability distributions 204 for the words of the input utterance 302. Each initial slot probability distribution 204 can have a number of probabilities equal to the number of possible slot types. As a particular example, each initial slot probability distribution 204 may have nine probabilities that identify the likelihoods of the associated word belonging to nine slot types. The nine slot types might include B-restaurant, I-restaurant, B-time, I-time, B-game, I-game, B-country, I-country, and O. Of course, the number of slot types and the specific slot types can vary based on a number of factors, such as based on the domain associated with an input utterance.

Assume in this example that "Mario's Italiano" is the name of a new restaurant or is the name of a restaurant for which the NLU base model 202 was not trained to recognize. Thus, "Mario's Italiano" is a new concept from the perspective of the NLU base model 202. Because of this, incorrect slot labels will likely be identified for the words "Mario's" and "Italiano." For instance, the outputs of the NLU base model 202 might indicate a high probability that the word "Mario's" is associated with a game (such as the B-game slot type) and a high probability that the word "Italiano" is associated with a country (such as the B-country slot type). Both of those determinations would be incorrect, which is illustrated in predicted slot labels 304 associated with the initial slot probability distributions 204 (where the two incorrect slot labels are shown in strikethrough).

The confidence calibration operation 206 applies a calibration probability distribution (such as a Dirichlet distribution in this example) to the initial slot probability distributions 204 in order to generate the calibrated slot probability distributions 208. As noted above, the calibration probability distribution has a higher dimensionality compared to the dimensions of the initial slot probability distributions 204. This remaps the probability values into a higher-dimensional space where there is less over-confidence.

The resulting calibrated slot probability distributions 208 are provided to the word uncertainty score calculation operation 210, which calculates the top-ranked slot labels and uncertainty scores 212 for the associated words in the input utterance 302. For example, the word uncertainty score calculation operation 210 may calculate the entropy of each calibrated slot probability distribution 208 to identify the uncertainty score for the word associated with that calibrated slot probability distribution 208. Here, the uncertainty scores are shown along with indicators identifying whether the uncertainty scores are below (L) or above (H) a threshold value. As can be seen in FIG. 3, the uncertainty score associated with the word "Mario's" is above the threshold value, while the uncertainty score associated with the word "Italiano" is also high but is not necessarily above the threshold value. As noted above, in some embodiments, the slot labels for words having low uncertainty scores can be determined by applying a softmax function or other function to the initial slot probability distributions 204 of those words.

The uncertain concept extraction operation 214 receives the top-ranked slot labels and uncertainty scores 212. The uncertain concept extraction operation 214 may also receive a dependency tree 220 for the input utterance 302. The uncertain concept extraction operation 214 can determine that the uncertainty score associated with the word "Mario's" exceeds the threshold value, so the uncertain concept extraction operation 214 can determine that the input utterance 302 contains at least one new concept not recognized by the NLU base model 202. The uncertain concept extraction operation 214 can also determine that the word "Italiano" is related to the word "Mario's," such as by using the dependency tree 220 to determine that both words are contained in the same phrase. The uncertain concept extraction operation 214 can therefore identify the phrase "Mario's Italiano" as being related to the new concept, and the uncertain concept extraction operation 214 might output this phrase. Based on this, revised slot labels 306 might be produced that replace the labels for these two words in the slot labels 304 with "unknown" labels. If desired, prompting may occur to obtain information associated with this phrase (such as from a user or online data source) in order to identify correct slot labels for these words. As described above, however, any other or additional actions may occur based on the identification of a new concept in an input utterance.

Although FIG. 3 illustrates one example of an application of the technique 200 for learning new concepts from input utterances, various changes may be made to FIG. 3. For example, the specific input utterance, dependency tree, and numerical values shown in FIG. 3 are for illustration only and can vary widely based on the use of the technique 200 and how the NLU base model 202 is trained.

Figure 4:
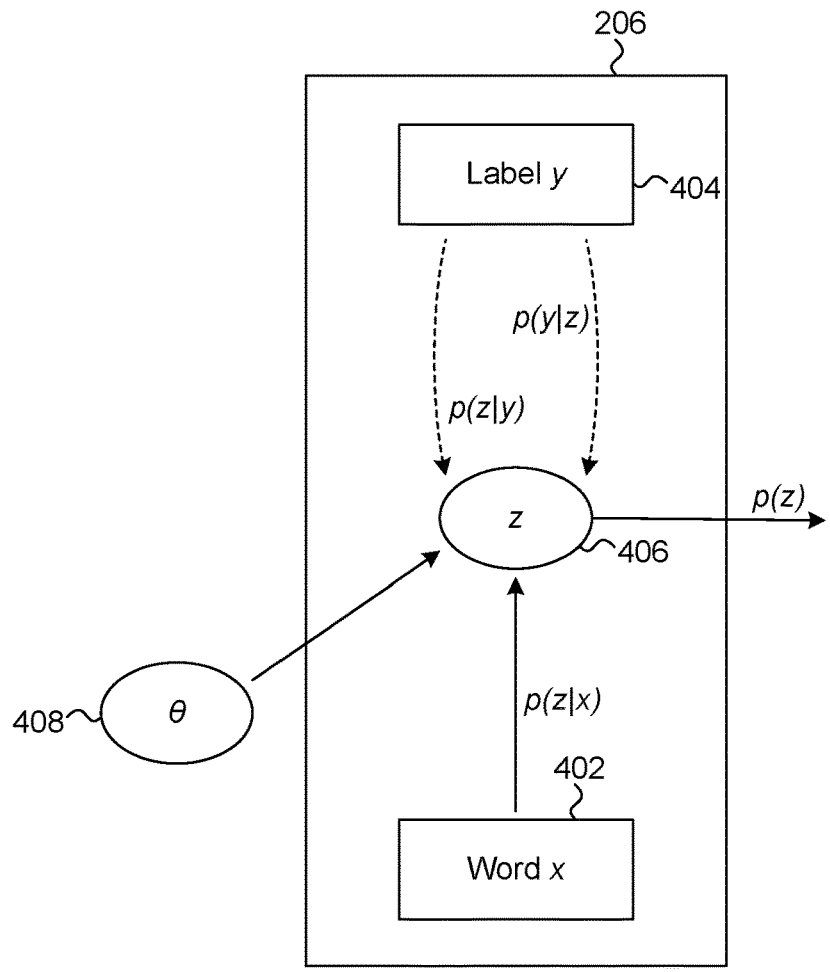
FIG. 4 illustrates an example confidence calibration operation in the technique for learning new concepts from input utterances in accordance with this disclosure.

FIG. 4 illustrates an example confidence calibration operation 206 in the technique 200 for learning new concepts from input utterances in accordance with this disclosure. For ease of explanation, the confidence calibration operation 206 of FIG. 4 may be described as being used by the electronic device 101 of FIG. 1. However, the confidence calibration operation 206 may be used with any suitable device(s) and in any suitable system(s), such as when the confidence calibration operation 206 is used with the server 106 in FIG. 1 or in another system.

As shown in FIG. 4, for a word 402 (denoted x) of an input utterance, a predicted slot label 404 (denoted y) can be determined. A variable 406 (denoted z) represents the latent variable that is used to introduce a higher number of dimensions in order to calibrate the confidence for the predicted slot label 404. Parameters 408 (denoted θ) represent the parameters of the model being used to introduce the higher number of dimensions (such as when the confidence calibration operation 206 is implemented as a machine learning model). The notation p(a|b) refers to the probability of a given b, and the notation p(c) refers to the probability of c. In the following discussion, ω is used to refer to the prediction confidence, meaning confidence in the prediction that word x has label y.

In some embodiments, for the word x in the input utterance, the confidence predicted by the NLU base model 202 can be expressed as P(ω|x, D), where D represents the training data used to train the NLU base model 202. This confidence can be decomposed as follows:

$$P(\omega|x, D) = \int \underbrace{P(\omega|x, \theta)}_{Data} \underbrace{p(\theta|D)}_{Model} d\theta \quad (1)$$

In Equation (1), the data uncertainty is described by the label-level posterior P(ω|x, θ), and the model uncertainty is described by the model-level posterior p(θ|D). Equation (1) may be further decomposed as follows:

$$P(\omega|x, D) = \quad (2)$$

$$\int \underbrace{P(\omega|\mu)p(\mu|x, \theta)}_{Data\quad Model} p(\theta|D) d\mu d\theta \approx \int \underbrace{P(\omega|\mu)}_{Data} \underbrace{p(\mu|x, \hat{\theta})}_{Model} d\mu$$

where:

$$p(\mu|x, \theta) = \prod_{i=1}^{n} P(\mu_i|\mu_1, \ldots, u_{i-1}, x; \theta)$$

$$P(\omega_t|\mu) = P(\omega_i|\mu_t) \quad (3)$$

Here, μ is a categorical distribution over a simplex $\mathbb{S}_k$ with $\mu=[\mu_1, \ldots, \mu_K]=[P(y=\omega(1)), \ldots, P(y=\omega(K))]^T$. Thus, μ is the predicted distribution of all possible K labels for the word x, and t represents each word in the input utterance. As can be seen here, each $\omega_t$ is only dependent on $\mu_t$.

In some embodiments, the confidence calibration operation 206 can apply a calibration probability distribution in the form of a Dirichlet distribution to the initial slot probability distributions 204 in order to generate calibrated slot probability distributions 208. A probability density function (PDF) of the Dirichlet prior distribution over all possible values of the K-dimensional categorical distribution μ may be expressed as:

$$Dir(\mu \mid \alpha) = \begin{cases} \frac{1}{B(\alpha)} \prod_{i=1}^{K} \mu(i)^{\alpha(i)-1} & \text{for } \mu \in \mathbb{S}_k \\ 0 & \text{otherwise} \end{cases} \quad (4)$$

Here, $\alpha=[\alpha(1), \ldots, \alpha(K)]^T$ is the concentration parameter of the Dirichlet distribution, where α(i)>0. Also, B(α) is a normalization factor and can be expressed as:

$$B(\alpha) = \frac{\prod_{i}^{K} \Gamma(\alpha(i))}{\Gamma(\sum_{i}^{k} \alpha(i))} \quad (5)$$

In particular embodiments, the confidence calibration operation 206 can be implemented using a Dirichlet prior RNN that is implemented by a neural network function with parameters θ. The neural network function operates to generate n K-dimensional vectors (where $\alpha_t \in \mathbb{R}^k$) at each timestamp t such that:

$$\alpha=(\alpha_1, \ldots, \alpha_n)=g(x \cup z, \theta) \quad (6)$$

in which there is:

$$Dir(\alpha_t)=P(\mu_t|\mu_1, \ldots, \mu_{t-1}, z; \hat{\theta}) \quad (7)$$

A degeneration of the Dirichlet prior RNN may be defined so that traditional RNN training can be used to train the confidence calibration operation 206. Here, posterior over labels at each timestamp t can be identified using the Dirichlet distribution as follows:

$$P(\mu_t \mid \mu_1, \ldots, \mu_{t-1}, x; \hat{\theta}) = \left[\frac{\alpha_t(1)}{a_t(0)}, \ldots, \frac{a_t(n)}{a_t(0)}\right] \quad (8)$$

During training, the confidence calibration operation 206 can be optimized to maximize the empirical marginal likelihood on a given training dataset D as follows:

$$E_{(x,y) \in D}\left[\frac{1}{n}\sum_{j=1}^{K}\sum_{t=1}^{n} y_t(j) \log\left(\frac{\alpha_t(j)}{\alpha_t(0)}\right)\right] \quad (9)$$

where $E_{(x, y)}$ represents a measure of cross-entropy. If $m_t$ denotes the last layer output of each word t in the NLU base model 202, it can be shown that maximizing $L_{Dir}$ is equivalent to maximizing sequence cross-entropy loss in the NLU base model 202 if the following condition is set:

$$\alpha_t=Me^{m_t}=M \exp(BaseNLU(x_t;\theta)) \quad (10)$$

where M is a scale constant.

In some embodiments, the word uncertainty score calculation operation 210 can compute uncertainty scores for words in an input utterance by calculating the entropies of the calibrated slot probability distributions 208 produced by the confidence calibration operation 206. Based on the definition of one possible implementation of the confidence calibration operation 206 described above, one possible implementation of the word uncertainty score calculation operation 210 can calculate the uncertainty score for a specific word that might be classified into one of k classes (one of K slot labels) as follows:

$$H(\alpha) = \log B(\alpha) + (\alpha(0) - K)\psi(\alpha(0)) - \sum_{i}^{k}(\alpha(i) - 1)\psi(\alpha(i)) \quad (11)$$

where:

$$a_0 = \sum_{i}^{k} \alpha_i \quad (12)$$

and where ψ the Digamma function.

Although FIG. 4 illustrates one example of the confidence calibration operation 206 in the technique 200 for learning new concepts from input utterances, various changes may be made to FIG. 4. For example, the description of FIG. 4 has provided the mathematical basis for using a Dirichlet distribution in order to increase the dimensionality of initial slot probability distributions 204 and generate calibrated slot probability distributions 208. Other possible implementations of the confidence calibration operation 206 may be used, and those implementations may or may not rely on a Dirichlet distribution in this way. This can also have an impact on how the word uncertainty score calculation operation 210 calculate the uncertainty scores.

Figure 5:
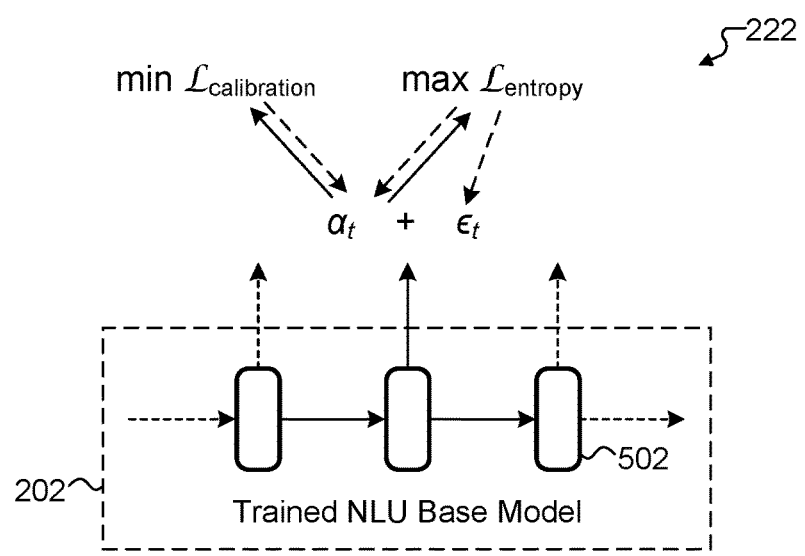
FIG. 5 illustrates an example multi-task calibration training operation in the technique for learning new concepts from input utterances in accordance with this disclosure.

FIG. 5 illustrates an example multi-task calibration training operation 222 in the technique 200 for learning new concepts from input utterances in accordance with this disclosure. For ease of explanation, the multi-task calibration training operation 222 of FIG. 5 may be described as being used by the electronic device 101 of FIG. 1. However, the multi-task calibration training operation 222 may be used with any suitable device(s) and in any suitable system(s), such as when the multi-task calibration training operation 222 is used with the server 106 in FIG. 1 or in another system.

In the example of FIG. 5, the NLU base model 202 is shown as including a number of layers 502, where each layer can produce an output. This may be common, for example, when the NLU base model 202 is implemented using an RNN or other similar type of machine learning model. Note, however, that other structures for the NLU base model 202 may be used here.

As described above, the multi-task calibration training operation 222 may engage in retraining 224 of the NLU base model 202 and/or retraining 226 of the confidence calibration operation 206 (such as retraining of the machine learning model used by the confidence calibration operation 206). The retraining 224 of the NLU base model 202 may involve attempting to minimize the low-dimensional sequence loss (expressed as $\mathcal{L}_{calibration}$) of the NLU base model 202. The retraining 226 of the confidence calibration operation 206 may involve attempting to maximize the high-dimensional entropy loss (expressed as $\mathcal{L}_{calibration}$) of the outputs produced by the confidence calibration operation 206. Performing these retraining operations can help make the confidence calibration operation 206 more clearly distinguish between known or "in distribution" (IND) concepts (concepts previously learned by the NLU base model 202) and new or "out of distribution" (OOD) concepts (concepts not previously learned by the NLU base model 202).

In some embodiments, the traditional sequence loss in the NLU base model 202 can be minimized according to the following expression:

$$\min \mathcal{L}_{calibration} = \mathbb{E}_{(z,y)\sim IND} \sum_{i=1}^{|S|} \sum_{t=1}^{n} y_t \log P_t(i) \quad (13)$$

Here, $P_t(i)$ is a prediction and is computed based on the design of the model used in the confidence calibration operation 206. When the confidence calibration operation 206 is implemented using a Dirichlet prior RNN, $P_t(i)$ may be expressed as:

$$P_t(i) = \left( \frac{\exp(BaseNLU(x_t; \theta))(i)}{\sum_{l=1}^{K} \exp(BaseNLU(x_t; \theta))(l)} \right) \quad (14)$$

In some embodiments, the entropy of the confidence calibration operation 206 can be maximized according to the following expression:

$$\max \mathcal{L}_{entropy} = \mathbb{E}_{(z,y)\sim IND}\left[ \sum_{i=1}^{n} H(\tilde{\alpha}_i(x_t)) \right] \quad (15)$$

$$\text{s.t.} \quad \forall t \|\epsilon_t\|_\infty < \tilde{\delta} \|\alpha_t\|_\infty; \quad W_c \geq 0$$

Here, $H(\cdot)$ is the entropy of the Dirichlet distribution with parameter $\tilde{\alpha}_t$ such that:

$$\tilde{\alpha}_t = \alpha_t - \in(\alpha_t; \delta) = (I - W_c)\alpha_t \quad (16)$$

where $\in$ is a scaling factor for $\alpha_t$. This approach helps to ensure that the calibration magnitude is small and that the value of $\in$ is negative. The value $\delta$ here represents a hyperparameter that can be selected such that $\|\in_t\|\infty < \delta\|\alpha_t\|\infty$ (meaning $\delta$ denotes the maximum allowed calibration ratio here).

Although FIG. 5 illustrates one example of a multi-task calibration training operation 222 in the technique 200 for learning new concepts from input utterances, various changes may be made to FIG. 5. For example, the description of FIG. 5 has provided the mathematical basis for retraining an NLU base model 202 and/or a confidence calibration operation 206 when the confidence calibration operation 206 supports use of a Dirichlet distribution. Other possible implementations of the confidence calibration operation 206 may be used (which may or may not rely on a Dirichlet distribution), so other retraining of the NLU base model 202 and/or the confidence calibration operation 206 may be used.

Figure 6:
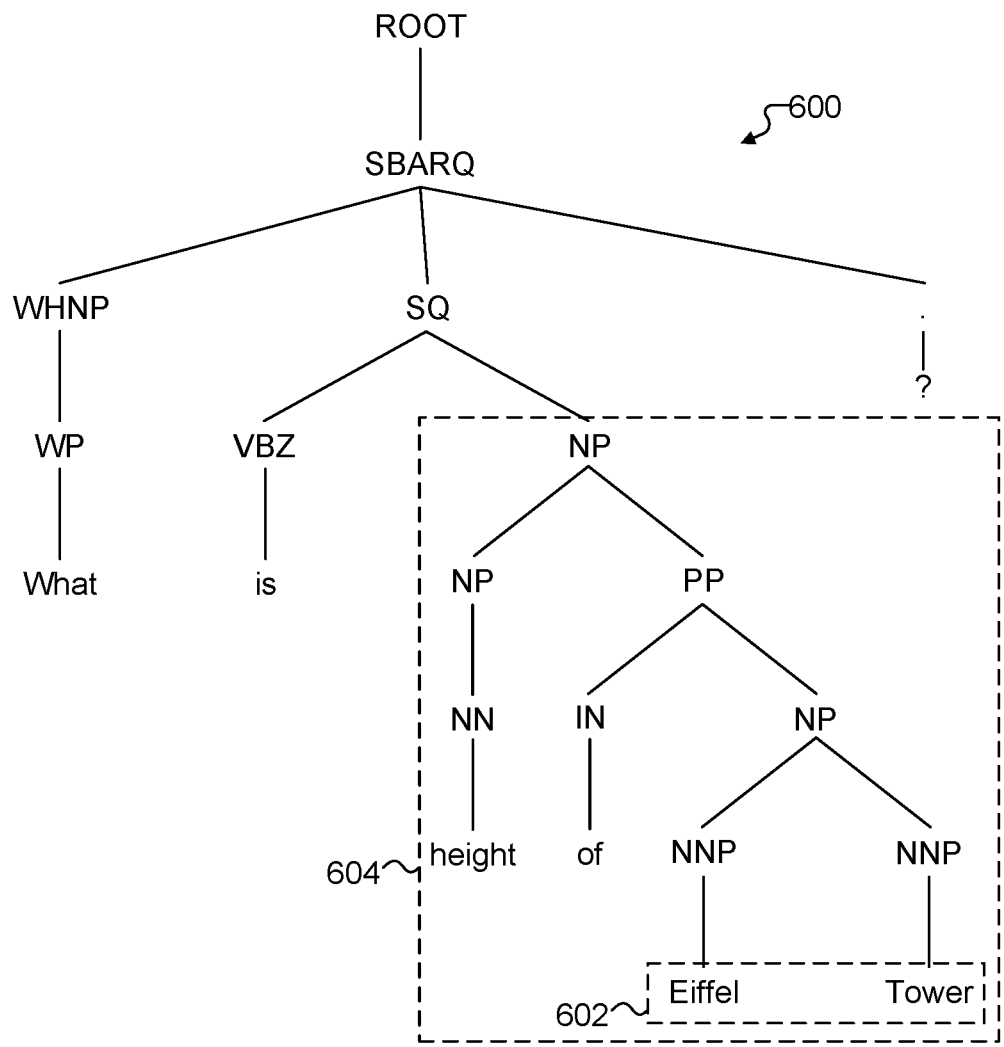
FIG. 6 illustrates example results obtained using the technique for learning new concepts from input utterances in accordance with this disclosure.

FIG. 6 illustrates example results obtained using the technique for learning new concepts from input utterances in accordance with this disclosure. In particular, FIG. 6 illustrates how a phrase of an input utterance may be identified as being related to a new concept. In this particular example, the input utterance is "What is the height of the Eiffel Tower?" A dependency tree 600 shown in FIG. 6 breaks down the input utterance while omitting two instances of "the" from the input utterance. The dependency tree 600 here can be generated using the dependency parser 218, which allows the system to obtain the syntax of the input utterance.

The input utterance can be processed as described above in order to produce calibrated slot probability distributions 208, where the calibrated slot probability distributions 208 are associated with the words of the input utterance shown in FIG. 6. The word uncertainty score calculation operation 210 can identify top-ranked slot labels and uncertainty scores 212 for the words using their calibrated slot probability distributions 208. For any word having an uncertainty score above a threshold, the uncertain concept extraction operation 214 might mark that word as having an "unknown" slot type.

The uncertain concept extraction operation 214 can also traverse the dependency tree 600 in order to identify any words related to the word or words having uncertainty scores above the threshold, and the uncertain concept extraction operation 214 can combine those words into a phrase associated with a new concept. For example, the uncertain concept extraction operation 214 might identify a word having an uncertainty score above the threshold and mark that word as having an unknown slot type. The uncertain concept extraction operation 214 can also determine that the nearest noun (N) or noun phrase (NP) root containing that word also contains one or more additional words. In response, the uncertain concept extraction operation 214 might mark each additional word as having an unknown slot type, and the uncertain concept extraction operation 214 can combine all of these words into a phrase associated with a new concept.

As one example of this, the uncertain concept extraction operation 214 might determine that the word "Eiffel" has an excessive uncertainty score and mark it as having an unknown slot type. The uncertain concept extraction operation 214 can also traverse the dependency tree 600 from that word and identify the nearest noun or noun phrase root containing the word "Eiffel." Here, the uncertain concept extraction operation 214 would determine that the identified noun or noun phrase also contains the word "Tower," so the uncertain concept extraction operation 214 can mark that word as having an unknown slot type, as well. In this way, the uncertain concept extraction operation 214 identifies a phrase 602 ("Eiffel Tower") as having unknown slot types and as being associated with a new concept.

As another example of this, the uncertain concept extraction operation 214 might determine that the word "Eiffel" has an excessive uncertainty score and mark it as having an unknown slot type. The uncertain concept extraction operation 214 can also traverse the dependency tree 600 from that word and identify a higher noun or noun phrase root containing the word "Eiffel." Here, the uncertain concept extraction operation 214 could determine that the identified noun or noun phrase also contains the words "height," "of," and "Tower," so the uncertain concept extraction operation 214 can mark those words as having unknown slot types, as well. In this way, the uncertain concept extraction operation 214 identifies a phrase 604 ("height of Eiffel Tower") as having unknown slot types and as being associated with a new concept.

Although FIG. 6 illustrates one example of results obtained using the technique for learning new concepts from input utterances, various changes may be made to FIG. 6. For example, the specific input utterance, dependency tree, and words identified as having an unknown slot type are for illustration only and can vary widely based on the use of the technique 200 and how the NLU base model 202 is trained.

As described above, possible prompting mechanisms that can be used to obtain information about a new concept can include (i) asking one or more questions to a user and receiving one or more responses related to the new concept and/or (ii) accessing an online or other data source for information related to the new concept. The following provides several example use cases of how these prompting mechanisms might be used to obtain information related to a new concept. Note, however, that these are example use cases only and do not limit the scope of this disclosure.

As a first example, assume a user provides an input utterance of "Show me game night in SPOTIFY." A voice-enabled personal assistant or other system may determine that "game night" is a new concept using the approach above, so the voice-enabled personal assistant or other system may respond with "What is game night?" The user may answer with "Game night is the name of a playlist." At that point, the voice-enabled personal assistant or other system can determine the intent of the initial utterance and start playing the "Game night" playlist, such as in a SPOTIFY app on the user's device.

As a second example, assume a user provides an input utterance of "Reserve at Mario's Italiano for 1 pm." A voice-enabled personal assistant or other system may determine that "Mario's Italiano" is a new concept using the approach above, so the voice-enabled personal assistant or other system may access an online data source and learn that a new restaurant is located nearby named "Mario's Italiano." At that point, the voice-enabled personal assistant or other system can automatically make a reservation at Mario's Italiano for 1 pm.

As a third example, assume a user provides an input utterance of "Find a subway and how to get there using subway." A voice-enabled personal assistant or other system may determine that both instances of "subway" are new concepts using the approach above, so the voice-enabled personal assistant or other system may respond with "Which subway do you want to find?" The user may answer with "SUBWAY restaurant." The voice-enabled personal assistant or other system may then respond with "Got it. Which subway to do want to use?" The user may answer with "Subway transportation." At that point, the voice-enabled personal assistant or other system can determine the intent of the initial utterance and respond with "OK. Here is the nearest SUBWAY restaurant. You can get there via subway line 1."

Again, these use cases are for illustration only. In general, the technique 200 described above may be used in conjunction with any suitable approach that allows a system to obtain additional information related to a new concept identified using the technique 200. Depending on the implementation, this may allow for continuously learning of new concepts in order to, for instance, better understand how user interests change over time or to provide better personalized services (such as personalized NLU-based services, personalized recommendations, or targeted advertisements).

Figure 7:
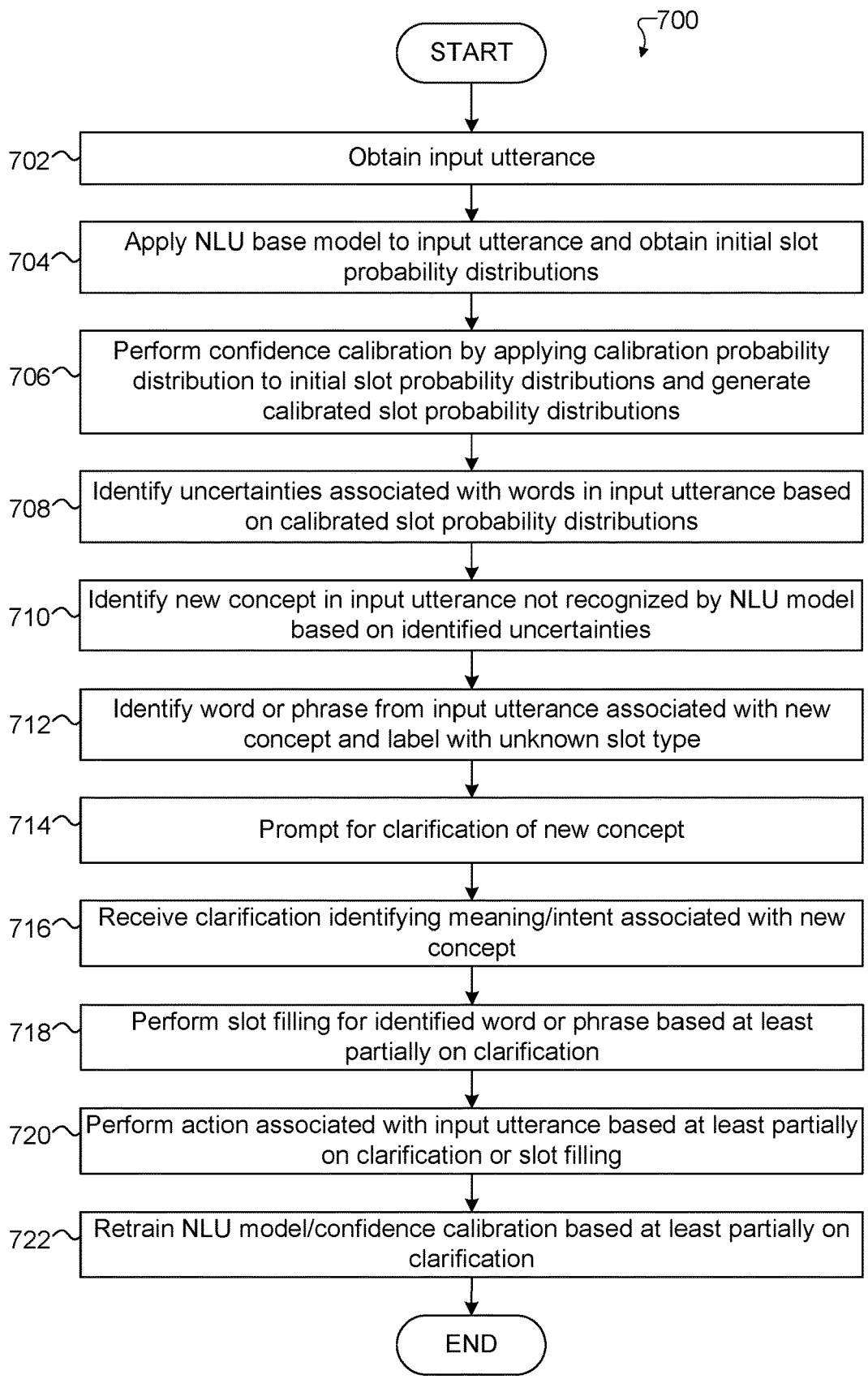
FIG. 7 illustrates an example method for learning new concepts from input utterances in accordance with this disclosure.

FIG. 7 illustrates an example method 700 for learning new concepts from input utterances in accordance with this disclosure. For ease of explanation, the method 700 of FIG. 7 may be described as being performed by the electronic device 101 of FIG. 1, which may use the technique 200 of FIG. 2. However, the method 700 may be performed using any suitable device(s) and in any other suitable system(s), and the method 700 may be performed as part of any suitable NLU-based algorithm.

As shown in FIG. 7, an input utterance is obtained at step 702. This may include, for example, the processor 120 of the electronic device 101 receiving the input utterance from a user or other source. The input utterance may be obtained in any suitable manner. In some instances, a user may type the input utterance into the electronic device 101 or speak the input utterance to the electronic device 101 (which can perform speech-to-text recognition). An NLU model is applied to the input utterance in order to obtain initial slot probability distributions at step 704. This may include, for example, the processor 120 of the electronic device 101 applying the NLU base model 202 to the input utterance and obtaining initial slot probability distributions 204 for words in the input utterance. The initial slot probability distributions 204 can identify the likelihoods of different words in the input utterance belonging to different slot types.

Confidence calibration is performed by applying a calibration probability distribution to the initial slot probability distributions in order to generate calibrated slot probability distributions at step 706. This may include, for example, the processor 120 of the electronic device 101 performing the confidence calibration operation 206 and generating calibrated slot probability distributions 208. The calibration probability distribution has a higher number of dimensions than the initial slot probability distributions 204. In some embodiments, the calibration probability distribution is a Dirichlet distribution.

Uncertainties associated with words in the input utterance are identified based on the calibrated slot probability distributions at step 708. This may include, for example, the processor 120 of the electronic device 101 performing the word uncertainty score calculation operation 210 and generating top-ranked slot labels and uncertainty scores 212 for words of the input utterance. In some embodiments, the uncertainties are identified by calculating entropies of the calibrated slot probability distributions 208 associated with the words in the input utterance. A new concept contained in the input utterance that is not recognized by the NLU model may be identified based on the identified uncertainties at step 710. This may include, for example, the processor 120 of the electronic device 101 performing the uncertain concept extraction operation 214 and determining whether any of the identified uncertainties exceeds a threshold value.

If a new concept is identified, any number of operations may occur involving or associated with the new concept. For instance, a word or phrase in the input utterance associated with the new concept may be identified and labeled as having an unknown slot type at step 712. This may include, for example, the processor 120 of the electronic device 101 labeling each word of the input utterance with an uncertainty score exceeding the threshold as having an unknown slot type. This may also include the processor 120 of the electronic device 101 traversing a dependency tree 220 associated with the input utterance to identify whether any other words of the input utterance are in the same phrase as a word marked as having an unknown slot type and, if so, marking each of the other words as having an unknown slot type.

A prompt for clarification of the new concept may be made at step 714, and a clarification identifying the meaning or intent associated with the new concept is received at step 716. This may include, for example, the processor 120 of the electronic device 101 providing one or more questions to a user, where the one or more questions ask the user to provide information about the new concept. This may also include the processor 120 of the electronic device 101 receiving one or more answers from the user. This may further include the processor 120 of the electronic device 101 accessing one or more online data sources in an attempt to identify additional information about the new concept.

Slot filling for the identified word or phrase related to the new concept can be performed based on the clarification at step 718. This may include, for example, the processor 120 of the electronic device 101 identifying one or more slot labels for the word or phrase in the input utterance associated with the new concept based on the received information. At least one action associated with the input utterance may be performed at step 720. This may include, for example, the processor 120 of the electronic device 101 identifying at least one desired action to be performed as instructed by the input utterance based on the clarification or the slot filling. Retraining of the NLU model and/or the confidence calibration may be performed at step 722. This may include, for example, the processor 120 of the electronic device 101 performing the multi-task calibration training operation 222 to retrain the NLU base model 202 and/or the confidence calibration operation 206 based at least partially on the clarification. As a particular example, this may include the processor 120 of the electronic device 101 performing the multi-task calibration training operation 222 to minimize sequence loss in the NLU base model 202 and to maximize entropy loss based on the calibrated slot probability distributions 208 generated by the confidence calibration operation 206.

Although FIG. 7 illustrates one example of a method 700 for learning new concepts from input utterances, various changes may be made to FIG. 7. For example, while shown as a series of steps, various steps in FIG. 7 may overlap, occur in parallel, occur in a different order, or occur any number of times. Also, various steps in FIG. 7 might be omitted, such as when one or some of the steps 712-722 are omitted following the identification of a new concept in an input utterance.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
applying, by at least one processor, a natural language understanding (NLU) model to an input utterance in order to obtain initial slot probability distributions;
performing, by the at least one processor, a confidence calibration by applying a calibration probability distribution to the initial slot probability distributions in order to generate calibrated slot probability distributions, the calibration probability distribution having a higher number of dimensions than the initial slot probability distributions in order to reduce over-confidence of the NLU model;
identifying, by the at least one processor, uncertainties associated with words in the input utterance based on the calibrated slot probability distributions;
identifying, by the at least one processor, a new concept contained in the input utterance that is not recognized by the NLU model using one or more of the identified uncertainties that exceed a threshold value;
identifying a word or phrase from the input utterance associated with the new concept; and
labeling the identified word or phrase with a slot type of unknown.

2. The method of claim 1, further comprising:
prompting for clarification of the new concept; and
performing slot filling for the identified word or phrase based at least partially on the clarification of the new concept.

3. The method of claim 1, further comprising:
prompting for clarification of the new concept; and
performing an action associated with the input utterance based on the clarification of the new concept.

4. The method of claim 1, further comprising:
prompting for clarification of the new concept; and
retraining at least one of the NLU model and the confidence calibration based at least partially on the clarification of the new concept.

5. The method of claim 4, wherein retraining at least one of the NLU model and the confidence calibration comprises:
retraining the NLU model to minimize sequence loss in the NLU model; and
retraining the confidence calibration to maximize entropy loss based on the calibrated slot probability distributions.

6. The method of claim 5, further comprising:
based on the retaining of the NLU model and the confidence calibration, improving distinguishing known in-distribution concepts from out-of-distribution concepts of the NLU model.

7. The method of claim 1, wherein:
the initial slot probability distributions identify likelihoods of different words in the input utterance belonging to different slot types;
the calibration probability distribution comprises a Dirichlet distribution; and
the uncertainties associated with the words in the input utterance comprise entropies of the calibrated slot probability distributions associated with the words in the input utterance.

8. An apparatus comprising:
at least one processor configured to:
apply a natural language understanding (NLU) model to an input utterance in order to obtain initial slot probability distributions;
perform a confidence calibration through application of a calibration probability distribution to the initial slot probability distributions in order to generate calibrated slot probability distributions, the calibration probability distribution having a higher number of dimensions than the initial slot probability distributions in order to reduce over-confidence of the NLU model;
identify uncertainties associated with words in the input utterance based on the calibrated slot probability distributions;
identify a new concept contained in the input utterance that is not recognized by the NLU model using one or more of the identified uncertainties that exceed a threshold value;
identify a word or phrase from the input utterance associated with the new concept; and
label the identified word or phrase with a slot type of unknown.

9. The apparatus of claim 8, wherein the at least one processor is further configured to:
prompt for clarification of the new concept; and
perform slot filling for the identified word or phrase based at least partially on the clarification of the new concept.

10. The apparatus of claim 8, wherein the at least one processor is further configured to:
prompt for clarification of the new concept; and
perform an action associated with the input utterance based on the clarification of the new concept.

11. The apparatus of claim 8, wherein the at least one processor is further configured to:
prompt for clarification of the new concept; and
retrain at least one of the NLU model and the confidence calibration based at least partially on the clarification of the new concept.

12. The apparatus of claim 11, wherein the at least one processor is configured to:
retrain the NLU model to minimize sequence loss in the NLU model; and
retrain the confidence calibration to maximize entropy loss based on the calibrated slot probability distributions.

13. The apparatus of claim 12, wherein the at least one processor is configured, based on the retaining of the NLU model and the confidence calibration, to improve distinguishing known in-distribution concepts from out-of-distribution concepts of the NLU model.

14. The apparatus of claim 8, wherein:
the initial slot probability distributions identify likelihoods of different words in the input utterance belonging to different slot types;
the calibration probability distribution comprises a Dirichlet distribution; and
the uncertainties associated with the words in the input utterance comprise entropies of the calibrated slot probability distributions associated with the words in the input utterance.

15. A non-transitory computer readable medium containing instructions that when executed cause at least one processor to:
apply a natural language understanding (NLU) model to an input utterance in order to obtain initial slot probability distributions;
perform a confidence calibration through application of a calibration probability distribution to the initial slot probability distributions in order to generate calibrated slot probability distributions, the calibration probability distribution having a higher number of dimensions than the initial slot probability distributions in order to reduce over-confidence of the NLU model;
identify uncertainties associated with words in the input utterance based on the calibrated slot probability distributions;
identify a new concept contained in the input utterance that is not recognized by the NLU model using one or more of the identified uncertainties that exceed a threshold value;
identify a word or phrase from the input utterance associated with the new concept; and
label the identified word or phrase with a slot type of unknown.

16. The non-transitory computer readable medium of claim 15, further containing instructions that when executed cause the at least one processor to:
prompt for clarification of the new concept; and
perform slot filling for the identified word or phrase based at least partially on the clarification of the new concept.

17. The non-transitory computer readable medium of claim 15, further containing instructions that when executed cause the at least one processor to:
prompt for clarification of the new concept; and
perform an action associated with the input utterance based on the clarification of the new concept.

18. The non-transitory computer readable medium of claim 15, further containing instructions that when executed cause the at least one processor to:
prompt for clarification of the new concept; and
retrain at least one of the NLU model and the confidence calibration based at least partially on the clarification of the new concept.

19. The non-transitory computer readable medium of claim 18, wherein the instructions that when executed cause the at least one processor to retrain at least one of the NLU model and the confidence calibration comprise:
instructions that when executed cause the at least one processor to:
retrain the NLU model to minimize sequence loss in the NLU model; and
retrain the confidence calibration to maximize entropy loss based on the calibrated slot probability distributions.

20. The non-transitory computer readable medium of claim 19, further containing instructions that when executed cause the at least one processor, based on the retaining of the NLU model and the confidence calibration, to improve distinguishing known in-distribution concepts from out-of-distribution concepts of the NLU model.

* * * * *